United States Patent [19]
Frame et al.

[11] Patent Number: 5,713,324
[45] Date of Patent: Feb. 3, 1998

[54] PISTON RING COATING

[75] Inventors: Rick L. Frame, Lynn; Paul D. Macy, Brownsville, both of Ind.; Mark M. Shuster, Toledo, Ohio

[73] Assignee: Dana Corporation, Toledo, Ohio

[21] Appl. No.: 636,769

[22] Filed: Apr. 19, 1996

[51] Int. Cl.$^6$ .................................. F16J 9/26; F02F 5/00
[52] U.S. Cl. ................................... 123/193.6; 92/223
[58] Field of Search ........................... 123/193.6, 193.4; 29/888.074; 92/222, 223; 252/29

[56] References Cited

U.S. PATENT DOCUMENTS

| | | |
|---|---|---|
| 2,807,511 | 9/1957 | Fleming . |
| 3,808,677 | 5/1974 | Schrock et al. . |
| 4,620,995 | 11/1986 | Otomo et al. . |
| 4,654,235 | 3/1987 | Effenberger et al. . |
| 4,873,951 | 10/1989 | Garthwaite . |
| 4,974,498 | 12/1990 | Lemelson ........................ 123/193.6 |
| 5,397,485 | 3/1995 | Weichsel et al. . |
| 5,469,777 | 11/1995 | Rao et al. ........................ 123/193.6 |
| 5,482,637 | 1/1996 | Rao et al. ........................ 252/29 |
| 5,531,195 | 7/1996 | Onoda et al. .................... 123/193.6 |

OTHER PUBLICATIONS

Product Data Sheet for XYLAN 1620 from Whitford Corporation.

*Primary Examiner*—Marguerite McMahon
*Attorney, Agent, or Firm*—Rader, Fishman and Grauer

[57] ABSTRACT

A system for preventing microwelding of a piston ring installed in a circumferential groove of a piston, wherein the ring has at least one piston groove engaging surface which is coated with thermal set resin, polytetrafluoroethylene and molydisulfide. This composition provides critical lubrication during the piston and piston ring break-in period and prevents localized high pressure, and high temperature areas which promote microwelding.

11 Claims, 2 Drawing Sheets

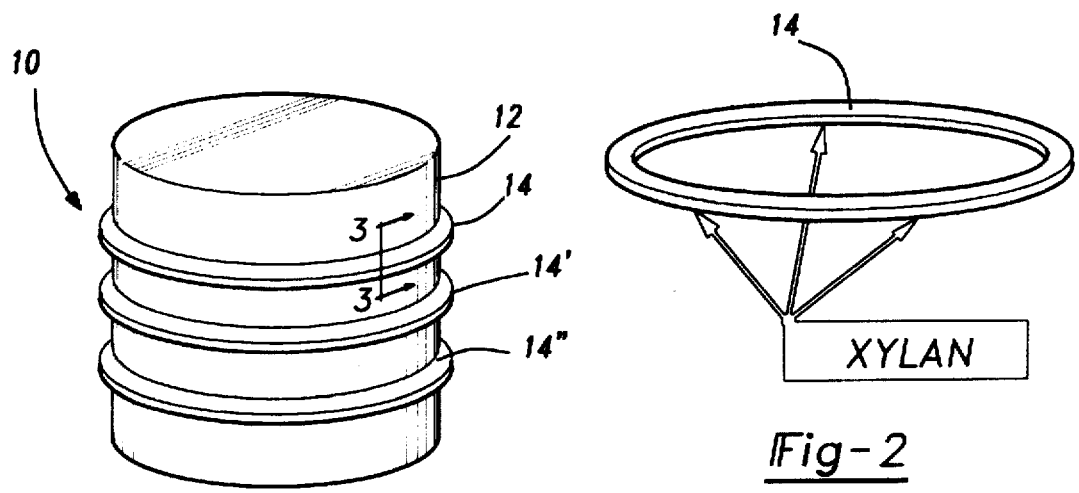
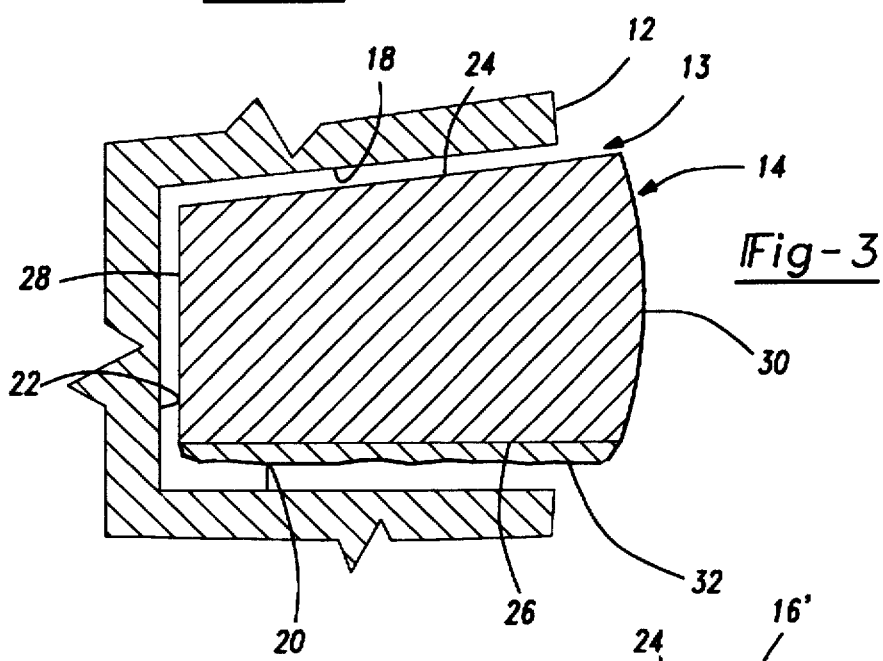
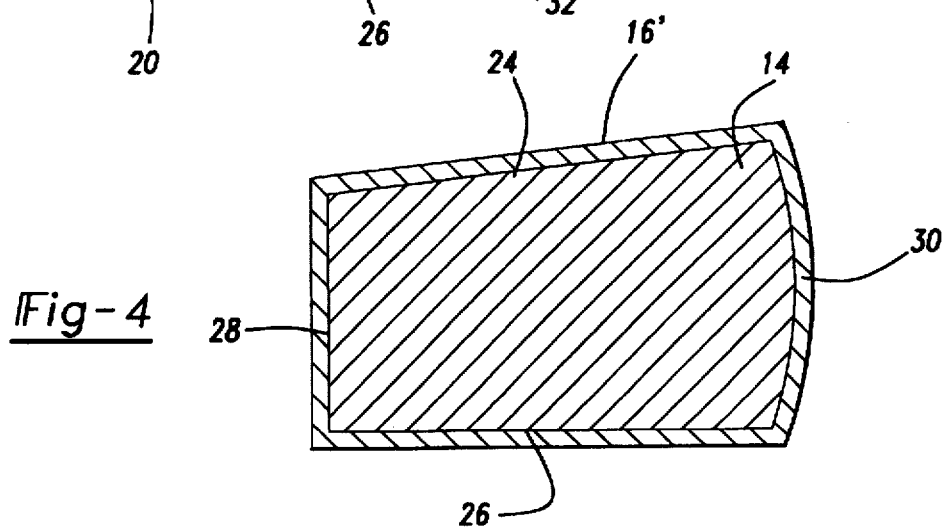

PISTON RING COATING

FIELD OF THE INVENTION

The present invention relates to lubricant compositions and more particularly to lubricant compositions for use in coating piston rings installed in internal combustion engines.

BACKGROUND OF THE INVENTION

Great strides have been made in extending the useful life of the internal combustion engine. Many of these improvements have been made possible by utilizing materials which reduce the friction between moving components used within the internal combustion engine. For example, coating the cylinder wall engaging surface of a piston ring with polytetrafluoroethylene (PTFE) to reduce the sliding friction between the piston ring and the cylinder wall is a known technique for reducing engine friction. It is also known to deposit PTFE between the rod bearings and the respective crank journal faces of an internal combustion engine to minimize friction.

In spite of these advancements, there still remains several friction intense areas of conventional engine designs which have not been adequately solved using even the most advanced friction reducing coatings. One such problem area relates to the interface between pistons and piston rings of internal combustion engines.

In the vast majority of internal combustion engines which use reciprocating pistons, the pistons are surrounded by piston rings to create a relatively efficient gas seal between the piston and the cylinder wall. Thus, when a charge within the engine cylinder is ignited, creating high combustion chamber pressures, the expanding gasses which are formed during the burning process are confined to the combustion chamber. The confined gases exert a downward force on the piston and are not permitted to escape between the piston and the cylinder wall. Although the piston ring is typically captured within a groove which is cut along an outside circumferential surface of the piston, the ring is sized relative to the groove so that is free to rotate within the groove. It is important that the piston ring be movable with respect to the groove because its relative movement results in a more uniform heat transfer between the piston and the cylinder walls.

There is a critical time period for new engines known as the break-in period during which the moving surfaces of joined components adjust to matingly conform to one another. During this break-in period the piston/piston ring interface is particularly susceptible to a condition known as microwelding, wherein there is a propensity for the piston ring to stick to the side walls of the piston groove. Microwelding is a phenomenon which causes the areas of contact between the piston and the piston ring to literally weld to one another as a result of the pressure and temperature experienced by the contact points. If during break-in, the piston ring can be kept free to move relative to the walls of the piston groove, the piston groove/piston ring will mate uniformly and microwelding will not occur.

SUMMARY OF THE INVENTION

The present invention is directed to a system for preventing microwelding of a ring to a piston and includes a ring which is coated with a composition of thermal set resin, polytetrafluoroethylene, and molydisulfide.

The present invention is also directed to a system for preventing microwelding of a ring to a piston and includes a piston which is adapted to reciprocate within a combustion chamber of an engine. The piston has an outer surface with a circumferential groove disposed therein. A ring is disposed within the circumferential groove, the ring including a cylinder wall engaging surface and a piston groove engaging surface. The piston groove engaging surface is coated with a composition of thermal set resin, polytetrafluoroethylene, and molydisulfide. Preferably, the ring includes a radially extending upper surface and a radially extending lower surface, wherein the piston groove engaging surface includes the lower surface of the ring.

The present invention is also directed to a method for preventing microwelding of a piston ring to a piston. A composition comprising thermal set resin, polytetrafluoroethylene, and molydisulfide is deposited on a surface of a piston ring. The composition is preferably cured by exposing the piston ring to an elevated temperature for a predetermined period of time.

BRIEF DESCRIPTION OF THE DRAWINGS

The features and inventive aspects of the present invention will become more apparent upon reading the following detailed description, claims, and drawings of which the following is a brief description:

FIG. 1 is the piston ring of the present invention installed in a circumferential groove of a piston.

FIG. 2 is a first embodiment of the piston ring of the present invention.

FIG. 3 is a partial cross-sectional view taken along lines 3—3 of FIG. 1.

FIG. 4 is a second embodiment of the preferred piston ring of the present invention.

DETAILED DESCRIPTION OF THE PREFERRED EMBODIMENTS

Figure 5:
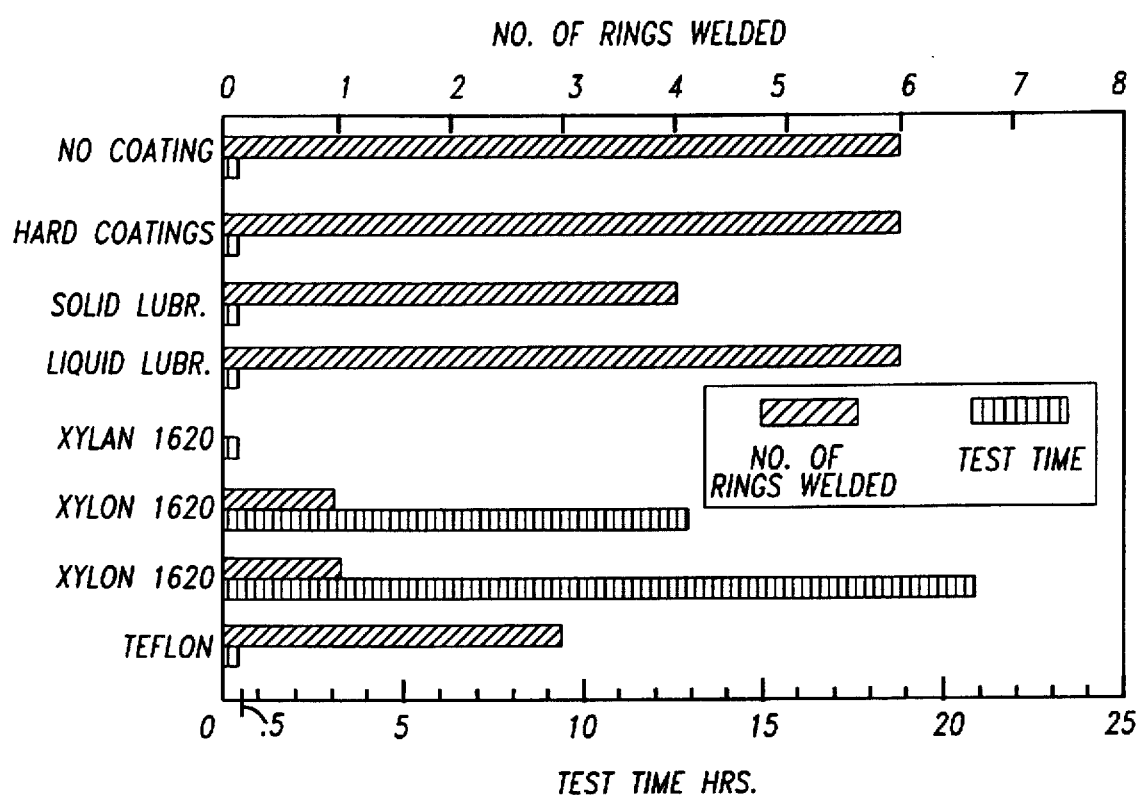
FIG. 5 is a graphical representation of comparative test results.

In a preferred system 10 of the present invention, as shown in FIG. 1, a piston 12 is fitted with at least one circumferential groove 13 (see FIG. 3). Groove 13 is defined by upper and lower radially extending walls 18, 20 respectively and a vertical wall 22. A piston ring 14 is typically installed within groove 13. It is not uncommon for piston 12 to have two or more rings 14, 14', 14" to ensure efficient sealing of combustion chamber gasses and to also ensure the minimal flow of lubricating oil into the combustion chamber from the engine crank case.

As shown in FIG. 3, a first embodiment of piston ring 14 includes upper and lower radially extending surfaces 24, 26, a radially inner vertical surface 28, and a radially outer cylinder wall engaging surface 30. Lower surface 26 is coated with a composition 32 of thermal set resin, polytetrafluoroethylene and molydisulfide. In a second embodiment, shown in FIG. 4, the entire outside surface offing 14 is coated with a composition 32' of thermal set resin, polytetrafluoroethylene and molydisulfide. The composition is currently marketed under the trade name of Xylan 1620™, Whitford Corporation, Box 507, Westchester, Pa. 19381-0507 (phone number 215-436-0600).

Xylan 1620™ is normally applied to parts to reduce wear. In the case of the present invention, however, it is used to permit ring 14 to move relative to walls 18, 20 and 22 of piston groove 13 and thereby to prevent microwelding. In some extremely demanding applications, it may be necessary to coat piston ring surfaces 24, 26, 28, and 30 with Xylan 1620™. However, current testing indicates that in most applications it is only necessary to coat lower engagement surface 26 of piston ring 14 to prevent microwelding. After the break-in period has expired, the Xylan 1620™ is usually worn away and plays no further role.

Xylan 1620™ prevents microwelding from occurring by allowing the piston groove surfaces and the piston ring to move relative to one another. Thus, uniform mating is promoted throughout the critical engine break-in period. Xylan 1620™ reduces or eliminates direct contact between ring 14 and piston groove walls 18, 20, and 22. Piston ring 14 is typically formed from ductile cast iron or steel. Piston 12 is typically formed from aluminum. By separating the dissimilarly composed piston 12 and ring 14 during the critical break-in period, the heat transfer between them is made uniform at the interface between ring 14 and walls 18, 20 and 22 of the piston groove. Thus, the two surfaces conform to one another without the high localized pressures and temperatures which might otherwise be experienced if not for the presence of the Xylan 1620™.

It is preferred that the Xylan 1620™ be applied to the ring surface or surfaces rather than walls 18, 20, 22 of piston groove 13. It is much easier to control the thickness and the placement of the Xylan 1620™ coating when the Xylan 1620™ is deposited on the ring as opposed to the walls of the piston groove. Additionally, when applied piston 12, Xylan 1620™ may act as a thermal barrier, resulting in too much heat resistance in the piston and possible piston failure. Further, if the softer aluminum of piston groove 13 were coated, Xylan 1620™ may undesireably separate from walls 18, 20, and 22 during the critical break-in period.

Preferably, the Xylan 1620™ is applied to the piston ring by way of dipping, spraying, or rolling. Thereafter, the ring is cured in an oven in accordance with the recommendations of the manufacturer of the Xylan. In tests discussed further below, the inventors applied the Xylan 1620™ by means of dipping and then cured the rings for approximately ten minutes at an approximate temperature of 232° C.

The following example will serve by way of illustration and not by way of limitation, the system of the present invention and the results obtained thereby in comparison to other materials.

As summarized in FIG. 5, the inventors conducted a series of experiments. For each experiment the inventors used six experimental piston rings installed in the upper groove of six pistons in a six cylinder internal combustion engine. A conventional piston ring was installed in the lower groove of each piston. The pistons, experimental piston rings, and lower conventional piston rings were replaced after each experiment. Each experimental piston ring had a diameter of 3.7 inches (94 mm), an edge width of 5/64 inches (2 mm), and a radial wall dimension of 0.136 inches (3.5 mm). The experimental rings were all formed from a ductile cast iron.

In a control experiment no coating was used. All six experimental piston rings exhibited microwelding within the baseline time of thirty minutes.

In a second set of experiments the inventors used various hard coatings. A first experiment involved a surface coating of chrome plating applied using an electrolytic bath. A second experiment involved a surface coating of titanium nitride using an ion plating method known in the art. A third experiment involved a surface coating of chromium nitride using an ion plating method known in the art. A fourth experiment involved a surface coating of gas nitriding wherein the gas nitride was applied using a gas furnace. In each of the four experiments all six experimental piston rings exhibited microwelding within the baseline time of thirty minutes.

In a third set of experiments the inventors used various solid lubricants. A first and second experiment involved molydisulfide based coatings sold by Dow Corning under the trade names Molykote D10™ and 106™, respectively. For each experiment the coatings were sprayed onto the six experimental piston rings and cured for approximately an hour at approximately 150° C. A third experiment involved the spraying of tungsten disulfide onto the experimental piston rings. In each of the three experiments an average of four rings exhibited microwelding within the baseline time of thirty minutes.

In a fourth set of experiments the inventors used various liquid lubricants. A first experiment involved dipping the experimental piston rings into engine oil. A second and a third experiment involved dipping the experimental piston rings into two different products sold under the trade name Biotron™. The first was an engine formulation and the second was a penetrating lubrication. In each of the three experiments all six rings exhibited microwelding within the baseline time of thirty minutes.

In a fifth set of experiments the inventors coated the experimental piston rings with a composition of thermal set resin, polytetrafluoroethylene and molydisulfide. The composition is currently marketed under the trade name of Xylan 1620™. The Xylan 1620™ was applied by means of dipping the experimental piston rings into the Xylan 1620™ and then curing the rings for approximately ten minutes at an approximate temperature of 232° C. As shown in FIG. 5 none of the rings exhibited microwelding after the baseline time of thirty minutes. Only one ring displayed microwelding after 13 hours. No additional experimental piston rings exhibited microwelding even after 21 hours.

In a sixth set of experiments the inventors sprayed the experimental piston rings with polytetrafluoroethylene and then cured the rings for approximately ten minutes at an approximate temperature of 232° C. Three of the six rings exhibited microwelding within the baseline time of thirty minutes.

Preferred embodiments of the present invention have been disclosed. A person of ordinary skill in the art would realize however, that certain modifications would come with the teachings of this invention. Therefore, the following claims should be studied to determine the true scope and content of the invention.

What is claimed is:

1. A system for preventing microwelding of a piston ring to a piston, comprising:

a piston ring having a surface coated with a composition of thermoset resin, polytetrafluoroethylene, and molydisulfide.

2. The system of claim 1, wherein said piston ring includes a cylinder wall engaging surface and at least one piston groove engagement surface wherein only said piston groove engagement surface is coated with said composition.

3. The system of claim 2, wherein said piston ring includes an upper radially extending surface and a lower radially extending surface, wherein said piston groove engaging surface of said piston ring comprises said lower surface.

4. The system of claim 1, wherein said ring is comprised of cast iron.

5. The system of claim 1, wherein said ring is comprised of steel.

6. A system for preventing microwelding of a piston ring to a piston, comprising:

a piston adapted to reciprocate within a combustion chamber of an engine, wherein said piston includes walls extending radially inwardly from an outer radial surface of said piston, said walls defining a circumferential groove; and a piston ring disposed within said circumferential groove, said ring including a cylinder wall engaging surface and at least one piston groove engaging surface, wherein at least one of said piston groove engaging surface of said ring and said circumferential piston groove is coated with a composition of thermoset resin, polytetrafluoroethylene, and molydisulfide.

7. The system of claim 6, wherein said piston is comprised of aluminum.

8. The system of claim 7, wherein said ring is comprised of one of cast iron and steel.

9. The system of claim 6, wherein said ring includes an upper radially extending surface and a lower radially extending surface, wherein said piston groove engaging surface comprises said lower radial surface.

10. A system for preventing microwelding of a ring to a piston, comprising the steps of:

(A) depositing on a surface of a piston ring a composition comprising thermoset resin, polytetrafluoroethylene, and molydisulfide, (B) curing said composition by exposing said piston ring to an elevated temperature for a predetermined period of time.

11. The system of claim 7, wherein step A further includes only depositing said composition on a bottom portion of said piston ring.

* * * * *